United States Patent
Shamaie

(10) Patent No.: US 9,697,418 B2
(45) Date of Patent: Jul. 4, 2017

(54) UNSUPERVISED MOVEMENT DETECTION AND GESTURE RECOGNITION

(71) Applicant: QUALCOMM Incorporated, San Diego, CA (US)

(72) Inventor: Atid Shamaie, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 632 days.

(21) Appl. No.: 13/796,599

(22) Filed: Mar. 12, 2013

(65) Prior Publication Data

US 2014/0010441 A1    Jan. 9, 2014

Related U.S. Application Data

(60) Provisional application No. 61/669,403, filed on Jul. 9, 2012.

(51) Int. Cl.
| | |
|---|---|
| *G06K 9/00* | (2006.01) |
| *G06K 9/46* | (2006.01) |
| *G06F 3/00* | (2006.01) |
| *G06F 3/01* | (2006.01) |
| *G06T 7/246* | (2017.01) |
| *G06K 9/62* | (2006.01) |

(52) U.S. Cl.
CPC ......... *G06K 9/00355* (2013.01); *G06F 3/005* (2013.01); *G06F 3/017* (2013.01); *G06K 9/00335* (2013.01); *G06K 9/4652* (2013.01); *G06T 7/246* (2017.01); *G06K 9/6218* (2013.01); *G06T 2207/10016* (2013.01); *G06T 2207/10024* (2013.01); *G06T 2207/30196* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 7,340,077 B2 | 3/2008 | Gokturk et al. | |
| 7,379,563 B2 | 5/2008 | Shamaie | |
| 7,808,478 B2 | 10/2010 | Choi et al. | |

(Continued)

FOREIGN PATENT DOCUMENTS

| | | |
|---|---|---|
| CN | 102324019 A | 1/2012 |
| CN | 103116895 A | 5/2013 |
| JP | 2013020311 A | 1/2013 |

OTHER PUBLICATIONS

Yang, M.—"Recognizing Hand Gesture Using Motion Trajectories"—1999 IEEE, pp. 1-7.*

(Continued)

*Primary Examiner* — Bernard Krasnic
(74) *Attorney, Agent, or Firm* — Kilpatrick Townsend & Stockton, LLP

(57) ABSTRACT

Various arrangements for recognizing gestures are presented. A plurality of color images of a scene may be received. Each image of the plurality of color images may be processed to make a plurality of processed color images. The processing of an image of the plurality of color images may comprise grouping pixels of the image being processed into a plurality of clusters based on color. A gesture may be identified using movement of a cluster of the plurality of clusters in the plurality of processed color images.

36 Claims, 9 Drawing Sheets
(1 of 9 Drawing Sheet(s) Filed in Color)

(56) References Cited

U.S. PATENT DOCUMENTS

| | | | |
|---|---|---|---|
| 8,320,622 B2 | 11/2012 | Smith | |
| 2007/0071311 A1* | 3/2007 | Rovira-Mas | G06T 7/004 382/154 |
| 2009/0079813 A1* | 3/2009 | Hildreth | H04N 7/147 348/14.03 |
| 2009/0295927 A1 | 12/2009 | Ohtake et al. | |
| 2009/0324008 A1* | 12/2009 | Kongqiao | G06F 3/017 382/103 |
| 2010/0295783 A1 | 11/2010 | El Dokor et al. | |
| 2010/0329509 A1 | 12/2010 | Fahn et al. | |
| 2012/0069168 A1 | 3/2012 | Huang et al. | |

OTHER PUBLICATIONS

Binh, N.—"Real-Time Hand Tracking and Gesture Recognition System"—Dec. 2005, GVIP 05 Conference, pp. 1-7.*
Ahmed, S.—"Real-time, Static and Dynamic Hand Gesture Recogniton for Human-Computer Interaction"—2008, pp. 1-17.*
International Search Report and Written Opinion—PCT/US2013/048446—ISA/EPO—Sep. 18, 2013.

\* cited by examiner

UNSUPERVISED MOVEMENT DETECTION AND GESTURE RECOGNITION

CROSS-REFERENCES TO RELATED APPLICATIONS

This application claims priority from and the benefit of U.S. Provisional Patent Application No. 61/669,403, filed Jul. 9, 2012, entitled "Unsupervised Hand Movement Detection and Gesture Recognition," which is hereby incorporated by reference in its entirety, as if set forth in full in this document, for all purposes.

BACKGROUND

A gesture can be a specific movement carried out by one or more hands (or other types of objects) that is associated with a command to be executed by an electronic device. The demand for a more natural and convenient machine-human interface may be seen as a driving force behind gesture recognition, as more and more electronic devices become a part daily life. For example, gesture detection may be useful for providing input to a computerized system. However, gesture detection may be processor intensive due at least in part to a need to identify an object, such as a person's hand, that is eligible to perform a gesture in one or more images prior to the gesture being detected.

SUMMARY

In some embodiments, a computer-implemented method of recognizing gestures is presented. The method may include receiving a plurality of color images of a scene. The method may include processing each image of the plurality of color images to make a plurality of processed color images. The processing of an image of the plurality of color images may include grouping pixels of the image being processed into a plurality of clusters based on color. The processing of an image of the plurality of color images may include identifying a gesture using movement of a cluster of the plurality of clusters in the plurality of processed color images.

Embodiments of such a method may include one or more of the following: Processing each image of the plurality of color images to make the plurality of processed color images may include assigning one or more tracking points to each cluster of the plurality of clusters. Identifying the gesture using the movement of the cluster of the plurality of clusters in the plurality of processed color images may include identifying the gesture using movement of a tracking point of the cluster of the plurality of clusters. Each tracking point may represent a location within the image of a corresponding color cluster. The location of the corresponding color cluster may include a value based on an average of coordinates of pixels in the corresponding color cluster, a median of coordinates of pixels in the corresponding color cluster, or both. Each pixel of each image of the plurality of processed color images may be grouped in the plurality of clusters. Each pixel of each image of the plurality of processed color images may be grouped solely based on color. Identifying the gesture using the movement of the cluster of the plurality of clusters in the plurality of processed color images may include evaluating movement of each cluster of the plurality of clusters based on gesture recognition criteria; and analyzing the movement of each cluster of the plurality of clusters to determine if each cluster performed a gesture based on evaluating the movement.

Additionally or alternatively, embodiments of such a method may include one or more of the following: Prior to analyzing the movement of each cluster of the plurality of clusters, the method may include identifying one or more types of objects corresponding to each cluster of the plurality of clusters has not been performed. The gesture recognition criteria may include at least one of: a trajectory of the movement of a cluster, a sequence of code vectors indicative of the movement of a cluster, a plurality of history vectors evaluated with one or more HMMs, and a velocity of the movement of a cluster as compared to a threshold and standard deviations of the velocity of the movement of other clusters of the plurality of clusters. Processing each image of the plurality of color images to make the plurality of processed color images further includes, for each of the plurality of color images prior to grouping the pixels of the image, converting one or more colors of the image. Converting the one or more colors of the image may include adjusting the one or more colors of the image such that the one or more colors of the image conform to the Lab color space. The method may include identifying an object based on the movement. The object may be a hand. Identifying the gesture using the movement of the cluster of the plurality of clusters in the plurality of processed color images may include detecting the movement of the cluster comprises creating a plurality of history vectors. Each history vector may correspond to a respective tracking point. Each history vector may be configured to identify movement of the respective tracking point over time. Identifying the gesture using the movement of the cluster of the plurality of clusters in the plurality of processed color images may include: comparing the plurality of history vectors with a plurality of predefined gestures; and identifying a history vector that most closely matches a predefined gesture of the plurality of predefined gestures.

In some embodiments, a system for recognizing gestures is presented. The system may include one or more processors. The system may also include a memory communicatively coupled with and readable by the one or more processors and having stored therein processor-readable instructions. When executed by the one or more processors, the processor-readable instructions may cause the one or more processors to receive a plurality of color images of a scene. The processor-readable instructions may cause the one or more processors to process each image of the plurality of color images to make a plurality of processed color images. The processing of an image of the plurality of color images may include grouping pixels of the image being processed into a plurality of clusters based on color. The processing of the image of the plurality of color images may include identifying a gesture using movement of a cluster of the plurality of clusters in the plurality of processed color images.

Embodiments of such a system may include one or more of the following: The processor-readable instructions that cause the one or more processors to process each image of the plurality of color images to make the plurality of processed color images may further include processor-readable instructions configured to cause the one or more processors to assign one or more tracking points to each cluster of the plurality of clusters. The processor-readable instructions that cause the one or more processors to identify the gesture using the movement of the cluster of the plurality of clusters in the plurality of processed color images may include processor-readable instructions configured to cause the one or more processors to identify the gesture using movement of a tracking point of the cluster of the plurality of clusters. Each tracking point may represent a location within the image of a corresponding color cluster. The location of the corresponding color cluster may include a value based on an average of coordinates of pixels in the corresponding color cluster, a median of coordinates of pixels in the corresponding color cluster, or both. Each pixel of each image of the plurality of processed color images may be grouped into at least one of the plurality of clusters. Each pixel of each image of the plurality of processed color images may be grouped solely based on color. The processor-readable instructions that cause the one or more processors to identify the gesture using the movement of the cluster of the plurality of clusters in the plurality of processed color images may include processor-readable instructions configured to cause the one or more processors to evaluate movement of each cluster of the plurality of clusters based on gesture recognition criteria to determine if each cluster performed a gesture based on evaluating the movement.

Additionally or alternatively, embodiments of such a system may include one or more of the following: Prior to the one or more processors analyzing the movement of each cluster of the plurality of clusters, one or more types of objects corresponding to each cluster of the plurality of clusters may not have been identified. The gesture recognition criteria may include at least one of: a trajectory of the movement of a cluster, a sequence of code vectors indicative of the movement of a cluster, a plurality of history vectors evaluated with one or more HMMs, and a velocity of the movement of a cluster as compared to a threshold and standard deviations of velocity of the movement of other clusters of the plurality of clusters. The processor-readable instructions that cause the one or more processors to process each image of the plurality of color images to make the plurality of processed color images may further include processor-readable instructions configured to cause the one or more processors to, for each of the plurality of color images, prior to grouping the pixels of the image, convert one or more colors of the image. The processor-readable instructions that cause the one or more processors to convert the one or more colors of the image may include processor-readable instructions configured to cause the one or more processors to adjust the one or more colors of the image such that the one or more colors of the image conform to the Lab color space.

Additionally or alternatively, embodiments of such a system may include one or more of the following: The processor-readable instructions may include processor-readable instructions which, when executed, cause the one or more processors to identify an object based on the movement. The object may be a hand. The processor-readable instructions that cause the one or more processors to identify the gesture using the movement of the cluster of the plurality of clusters in the plurality of processed color images may further include processor-readable instructions configured to cause the one or more processors to detect the movement of the cluster, the detecting comprises creating a plurality of history vectors. Each history vector may correspond to a respective tracking point. Each history vector may be configured to identify movement of the respective tracking point over time. The processor-readable instructions that cause the one or more processors to identify the gesture using the movement of the cluster of the plurality of clusters in the plurality of processed color images may include processor-readable instructions configured to cause the one or more processors to: compare the plurality of history vectors with a plurality of predefined gestures; and identify a history vector that most closely matches a predefined gesture of the plurality of predefined gestures.

In some embodiments, an apparatus for recognizing gestures is presented. The apparatus may include means for receiving a plurality of color images of a scene. The apparatus may include means for processing each image of the plurality of color images to make a plurality of processed color images. The means for processing of an image of the plurality of color images may include: Means for grouping pixels of the image being processed into a plurality of clusters based on color. The apparatus may include means for identifying a gesture using movement of a cluster of the plurality of clusters in the plurality of processed color images.

Embodiments of such an apparatus may include one or more of the following: The apparatus may include means for assigning one or more tracking points to each cluster of the plurality of clusters. The means for identifying the gesture using the movement of the cluster of the plurality of clusters in the plurality of processed color images may include means for identifying the gesture using movement of a tracking point of the cluster of the plurality of clusters. Each tracking point may represent a location within the image of a corresponding color cluster. The location of the corresponding color cluster may include a value based on an average of coordinates of pixels in the corresponding color cluster, a median of coordinates of pixels in the corresponding color cluster, or both. The means for assigning one or more tracking points to each cluster of the plurality of clusters may include means for assigning two or more tracking points to the cluster of the plurality of clusters, and the means for identifying may comprise means for separately determining for each tracking point of the two or more tracking points whether movement of the tracking point corresponds to the gesture. Each pixel of each image of the plurality of processed color images may be grouped in to at least one of the plurality of clusters. Each pixel of each image of the plurality of processed color images may be grouped solely based on color. The means for identifying the gesture using the movement of the cluster of the plurality of clusters in the plurality of processed color images may include means for evaluating movement of each cluster of the plurality of clusters based on gesture recognition criteria to determine if each cluster performed the gesture. The apparatus may include means for identifying one or more types of objects corresponding to each cluster of the plurality of clusters has not been performed prior to analyzing the movement of each cluster of the plurality of clusters. The gesture recognition criteria may include at least one of: a trajectory of the movement of a cluster, a sequence of code vectors indicative of the movement of a cluster, a plurality of history vectors evaluated with one or more HMMs, and a velocity of the movement of a cluster as compared to a threshold and standard deviations of velocity of movement of other clusters of the plurality of clusters.

Additionally or alternatively, embodiments of such an apparatus may include one or more of the following: The means for processing each image of the plurality of color images to make the plurality of processed color images may further include, for each of the plurality of color images means for converting one or more colors of the image prior to grouping the pixels of the image. The apparatus may include means for adjusting the one or more colors of the image such that the one or more colors of the image conform to a Lab color space. The apparatus may include means for identifying an object based on the movement. The object may be a hand. The means for identifying the gesture using the movement of the cluster of the plurality of clusters in the plurality of processed color images may include means for detecting the movement of the cluster, the detecting comprising creating a plurality of history vectors. Each history vector of the plurality of history vectors may correspond to a respective tracking point. Each history vector of the plurality of history vectors may be configured to identify movement of the respective tracking point over time. The means for identifying the gesture using the movement of the cluster of the plurality of clusters in the plurality of processed color images may include means for comparing the plurality of history vectors with a plurality of predefined gestures. The means for identifying the gesture using the movement of the cluster of the plurality of clusters in the plurality of processed color images may include means for identifying a history vector of the plurality of history vectors that most closely matches a predefined gesture of the plurality of predefined gestures.

In some embodiments, an apparatus for recognizing gestures may be presented. The apparatus may include means for receiving a plurality of color images of a scene. The apparatus may include means for processing each image of the plurality of color images to make a plurality of processed color images. The means for processing of an image of the plurality of color images may include: means for grouping pixels of the image being processed into a plurality of clusters based on color; and means for identifying a gesture using movement of a cluster of the plurality of clusters in the plurality of processed color images.

Embodiments of such an apparatus may include one or more of the following: The means for processing each image of the plurality of color images to make the plurality of processed color images may include means for assigning one or more tracking points to each cluster of the plurality of clusters. The means for identifying the gesture using the movement of the cluster of the plurality of clusters in the plurality of processed color images may include means for identifying the gesture using movement of a tracking point of the cluster of the plurality of clusters.

In some embodiments, a computer program product residing on a non-transitory processor-readable medium for recognizing gestures is presented. The computer program product may include processor-readable instructions configured to cause a processor to receive a plurality of color images of a scene. The processor-readable instructions may be further configured to cause the processor to process each image of the plurality of color images to make a plurality of processed color images. The processing of an image of the plurality of color images may include grouping pixels of the image being processed into a plurality of clusters based on color. The processing of an image of the plurality of color images may include identifying a gesture using movement of a cluster of the plurality of clusters in the plurality of processed color images.

Embodiments of such a computer program product may include one or more of the following: The computer program product for recognizing gestures of claim 36, wherein the processor-readable instructions that cause the processor to process each image of the plurality of color images to make the plurality of processed color images may further include processor-readable instructions configured to cause the processor to assign one or more tracking points to each cluster of the plurality of clusters. The processor-readable instructions that cause the processor to identify the gesture using the movement of the cluster of the plurality of clusters in the plurality of processed color images may include processor-readable instructions configured to cause the processor to identify the gesture using movement of a tracking point of the cluster of the plurality of clusters. Each tracking point may represent a location within the image of a corresponding color cluster.

In some embodiments, a computer-implemented method of recognizing gestures is presented. The method may include receiving, via an input interface, a plurality of color images of a scene. The method may include processing, with a processing unit, each image of the plurality of images to make a plurality of processed color images. The processing of each image may include: grouping pixels of the image into a plurality of clusters based on color; and determining, from the processed color images, whether a motion of at least one of the plurality of clusters comprises a gesture.

Embodiments of such a method may include one or more of the following: The method may include converting one or more colors of the image. The method may include assigning at least one tracking point for each of the plurality of clusters. The determining whether the motion of the at least one of the plurality of clusters comprises the gesture may include: evaluating the motion of two or more of the plurality of clusters based on one or more gesture recognition criteria; and determining whether the motion of each of the two comprises a gesture based on the evaluating. The gesture recognition criteria may include at least one of: a trajectory of the motion of a cluster, a sequence of code vectors indicative of the motion of a cluster, a plurality of history vectors evaluated with an HMM, and a velocity of the motion of a cluster as compared to a threshold and standard deviations of velocity of motion of the other clusters. Each tracking point may represent a location on the image representative of a combined location of a corresponding color cluster. The combined location of the corresponding color cluster may include a value based on either or both of an average or a median of coordinates of pixels in the corresponding color cluster. For each of the plurality of color images, converting the one or more colors of the image may include adjusting the one or more colors of the image such that the colors of the image conform to the Lab color space. The method may include identifying an object based on the motion.

In some embodiments, a computer-implemented method of recognizing gestures made by an object is presented. The method may include receiving, via an input interface, a plurality of color images of the object. The method may include processing, with a processing unit, each image of the plurality of color images to make a plurality of processed color images. The processing of each image may include converting one or more colors of the image; grouping the colors of the image into a plurality of color clusters; and assigning at least one tracking point for each of the plurality of color clusters. The method may include determining, from the processed color images, a motion of the object based on at least one of the tracking points. The method may include recognizing a gesture based on the determined motion.

Embodiments of such a method may include one or more of the following: Each tracking point may represent a location on the image representative of a combined location of a corresponding color cluster. The combined location of the corresponding color cluster may include a value based on either or both of an average or a median of coordinates of pixels in the corresponding color cluster. For each of the plurality of color images, the method may include converting the one or more colors of the image comprises adjusting the one or more colors of the image such that the colors of the image conform to the Lab color space. The object may be a hand. The plurality of color clusters may include at least two color clusters. Each of the plurality of color clusters may be assigned a plurality of tracking points. Detecting the motion of the object may include creating a plurality of history vectors, wherein: each history vector corresponds to a respective tracking point, and each history vector is configured to identify a movement of the respective tracking point over time. Recognizing the gesture may include: comparing each of the plurality of history vectors with known gestures; and identifying a history vector that most closely matches a known gesture. Recognizing the gesture may include adjusting a length of a history vector based on a velocity of the history vector's respective tracking point. Recognizing the gesture may include analyzing each of the plurality of history vectors to determine, for each respective tracking point of each history vector: a velocity, and a standard deviation of the velocity. Recognizing the gesture based on the determined motion may include utilizing one or more trained machine learning algorithms.

In some embodiments, a non-transitory computer-readable medium having instructions embedded thereon for recognizing gestures made by an object is presented. The instructions may include computer-executable code for receiving a plurality of color images of the object. The instructions may include computer-executable code for processing each image of the plurality of color images to make a plurality of processed color images. The processing of each image may include converting one or more colors of the image; grouping the colors of the image into a plurality of color clusters; and assigning at least one tracking point for each of the plurality of color clusters. The instructions may include computer-executable code for determining, from the processed color images, a motion of the object based on at least one of the tracking points; and recognizing a gesture based on the determined motion.

In some embodiments, a system for recognizing gestures made by an object is presented. The system may include receiving means for receiving a plurality of color images of the object. The system may include computing means for: processing, with a processing unit, each image of the plurality of color images to make a plurality of processed color images, wherein the processing of each image includes: converting one or more colors of the image; grouping the colors of the image into a plurality of color clusters; and assigning at least one tracking point for each of the plurality of color clusters. The system may include computing means for determining, from the processed color images, a motion of the object based on at least one of the tracking points. The system may include computing means for recognizing a gesture based on the determined motion.

In some embodiments, a device for recognizing gestures made by an object may be presented. The device may include a camera. The device may include one or more processors coupled to the camera, the one or more processors configured to receive a plurality of color images of the object from the camera. The one or more processors may be configured to process each image of the plurality of color images to make a plurality of processed color images, wherein processing of each image includes: converting one or more colors of the image; grouping the colors of the image into a plurality of color clusters; and assigning at least one tracking point for each of the plurality of color clusters. The one or more processors may be configured to determine, from the processed color images, a motion of the object based on at least one of the tracking points. The one or more processors may be configured to recognize a gesture based on the determined motion. The one or more processors may be further configured to provide, via the output interface, an indication of the recognized gesture.

In some embodiments a method is presented. The method may include obtaining a plurality of images. The method may include grouping features of the image into a plurality of groups or clusters. The method may include tracking one or more of the groups or clusters across the plurality of images. The method may include determining whether a gesture has been performed based on the tracking. It may be determined that a gesture has been performed, wherein the method further comprises identifying an object based on the determination that the gesture has been performed.

Additionally or alternatively, such a method may include one or more of the following: Identifying may include identifying a hand. The features may include colors. The method may include converting colors in the image into another color space prior to grouping the features of the image. The tracking may include tracking a median of each of the groups or clusters.

BRIEF DESCRIPTION OF THE DRAWINGS

A further understanding of the nature and advantages of various embodiments may be realized by reference to the following figures. The patent or application file contains at least one drawing executed in color. Copies of this patent or patent application publication with color drawing(s) will be provided by the Office upon request and payment of the necessary fee.

DETAILED DESCRIPTION

Figure 1A:
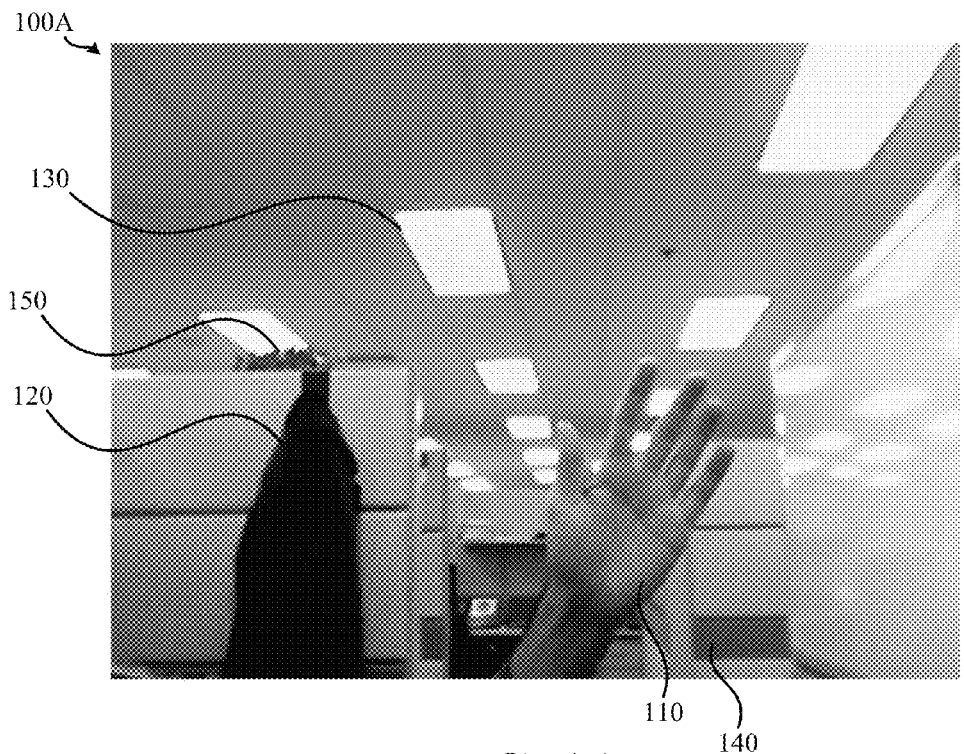
FIG. 1A illustrates an embodiment of an RGB image of a hand.

Embodiments are directed toward providing an unsupervised color classification and movement detection process that may be performed without relying on prior and/or trained information regarding an object that is moving in some embodiments.

Traditional gesture recognition systems typically involve one or more initial object identification processes to identify objects eligible for subsequent gesture recognition. For example, in traditional arrangements, prior to determining if a user has performed a gesture, a gesture-based recognition system may locate the user's hand. These processes can consume time and/or processing resources. Further, such processes may be inaccurate in some scenarios, for example when a hand or skin tone of the hand is not known or recognized.

Embodiments detailed herein provide for detection of gestures without the need to identify an object (such as a user's hand) for gesture recognition. Further, no prior and/or training information regarding any types of objects which may perform gestures may be necessary. Further, no depth information may need to be present in images used for such gesture detection. As such, a color image capturing device, such as a video camera, may be used for capturing images suitable for gesture detection.

Embodiments detailed herein may utilize sequential image information, such as a video feed from one or more (color) cameras, to recognize one or more gestures. One or more objects, such as a user's hand, may be subsequently or substantially concurrently identified based on detected movement. Accordingly, while traditional arrangements may first identify an object, then detect a gesture performed by the object, embodiments detailed herein may first detect a gesture, then identify the object that performed the gesture.

Further, embodiments detailed herein can be utilized in conjunction with other gesture-recognition techniques. For example, techniques described herein can be utilized for initial object identification. For example, embodiments detailed herein may be used to identify an engagement gesture performed by a user's hand. Once the engagement gesture is detected, the object that performed the engagement gesture may be tracked to watch for additional gestures. Other gesture recognition techniques that require prior object identification may be utilized thereafter for the additional gestures. For example, embodiments described herein may be used to identify a general motion, such as a circular engagement motion, with the object that performed the circular engagement gesture thereafter being tracked.

The term "gesture" is defined to include movement by one or more hands and/or other objects intended to communicate a message or a command to a device or to engage the device or initiate one or more operations of the device. Embodiments detailed herein focus on the recognition of gestures performed by one or more hands of a user; however, the techniques disclosed can be applied to the detection of gestures performed by other objects.

In some embodiments, a series of images are captured by an image capture device. Such an image capture device may be a video camera, or, more generally, a camera. The captured images may be in color. These images may be transferred from an image capture device to a device that performs movement detection and/or gesture recognition.

According to some embodiments, color images received for movement detection and/or gesture recognition may be converted to L*a*b* color space. The L*a*b* (or simply "Lab") color space is a non-linear space covering all possible natural colors and a wide set of imaginary colors. In the Lab space, "L" is lightness, and "a" and "b" are color components. Hand (skin) color may be distinguished from other colors in images by using the a and b components of the images in the Lab space. No prior information regarding the skin color may be necessary; the skin color may be processed in the same manner as each other color present in the image.

FIG. 1A illustrates an embodiment of an image 100A that contains a hand. Image 100A contains hand 110, along with other objects, such as jacket 120, light 130, cubicle accent panel 140, and plant 150. Image 100A was captured using a color image capture device. Image 100A may contain no depth information in some embodiments. For instance, pixels of image 100A may not contain a depth value. Image 100A may be in RGB format.

Figure 1B:
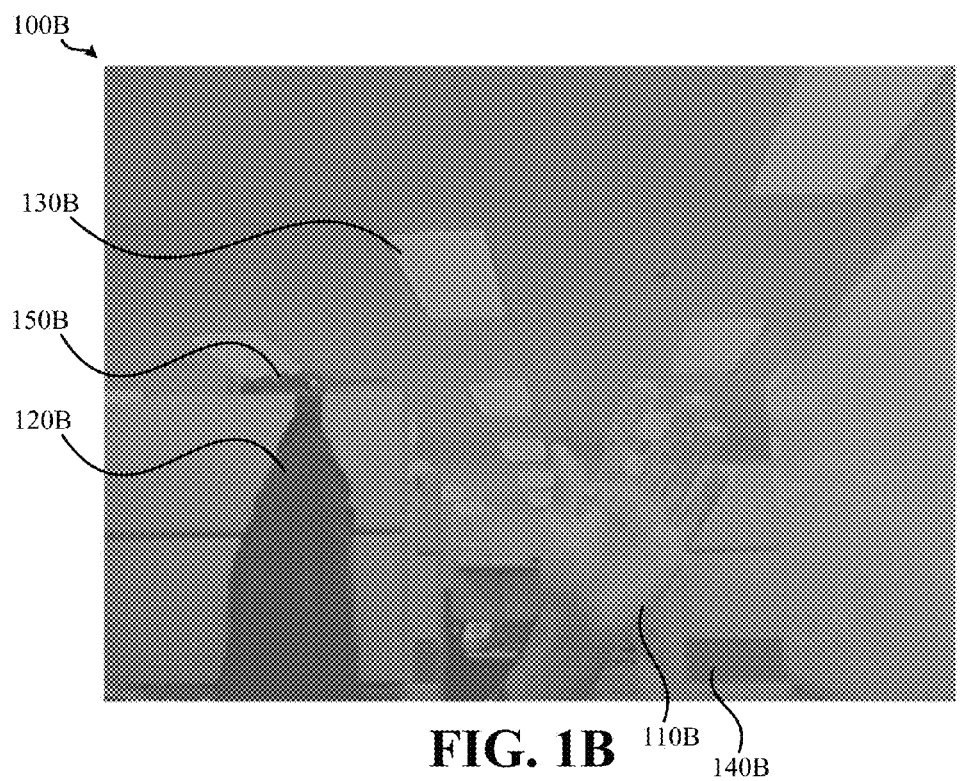
FIG. 1B illustrates an embodiment of the RGB image of FIG. 1A converted to the Lab color space.

FIG. 1B illustrates an embodiment of an image 100B of the RGB image of FIG. 1A converted to the Lab color space. Although embodiments provided herein discuss converting an RGB image to the Lab space, other embodiments may utilize different input images (which may be other than RGB) and/or convert one or more colors of an input image to color spaces other than Lab. Image 100B contains hand 110B, along with other objects, such as jacket 120B (which corresponds to jacket 120), light 130B (which corresponds to light 130), cubicle accent panel 140B (which corresponds to cubicle accent panel 140), and plant 150B (which corresponds to plant 150).

Following conversion into the Lab color space, movement detection and gesture recognition may involve an unsupervised clustering algorithm to the Lab images. "Unsupervised" refers to there being no positive or negative feedback based on the solution output by the clustering algorithm that is used to refine future application of the clustering algorithm. In some embodiments, the clustering algorithm can be performed without any prior input and/or feedback from a user. The clustering algorithm may cluster all pixels in a Lab image by using the a and b components of the image pixels. Similar colors are grouped into distinct color clusters. A Lab image may be grouped into a predefined number of distinct color clusters. If a gesture is being performed by a hand, it may be useful that each pixel of the Lab image corresponding to the hand be grouped into a single cluster. This may be possible because color variation across a typical hand may be small. Color clustering may be able to separate the colors of a hand into an individual cluster if an appropriate number of clusters are utilized to process the Lab image.

A clustering algorithm, such as k-means, can be used to cluster the images into a number of clusters based on a and b components. According to some embodiments, the L component is not used in color clustering. Other embodiments, however, utilize the L component during color clustering. According to experimental results, roughly three to seven color clusters can be utilized in order to allow the colors of a hand to be clustered together. Results may depend on the background colors present in the image. According to some embodiments, this parameter can be adjusted automatically or based on user input in other environments which can help ensure that human skin receives its own individual cluster. That said, some embodiments may utilize more clusters (e.g., 10, 15, 20, 25, 30, or more), in which case the colors of the hand may be grouped into more than one cluster. Thus, multiple clusters may move when the hand moves and may be detected as performing a gesture, as described in more detail below.

Figure 2:
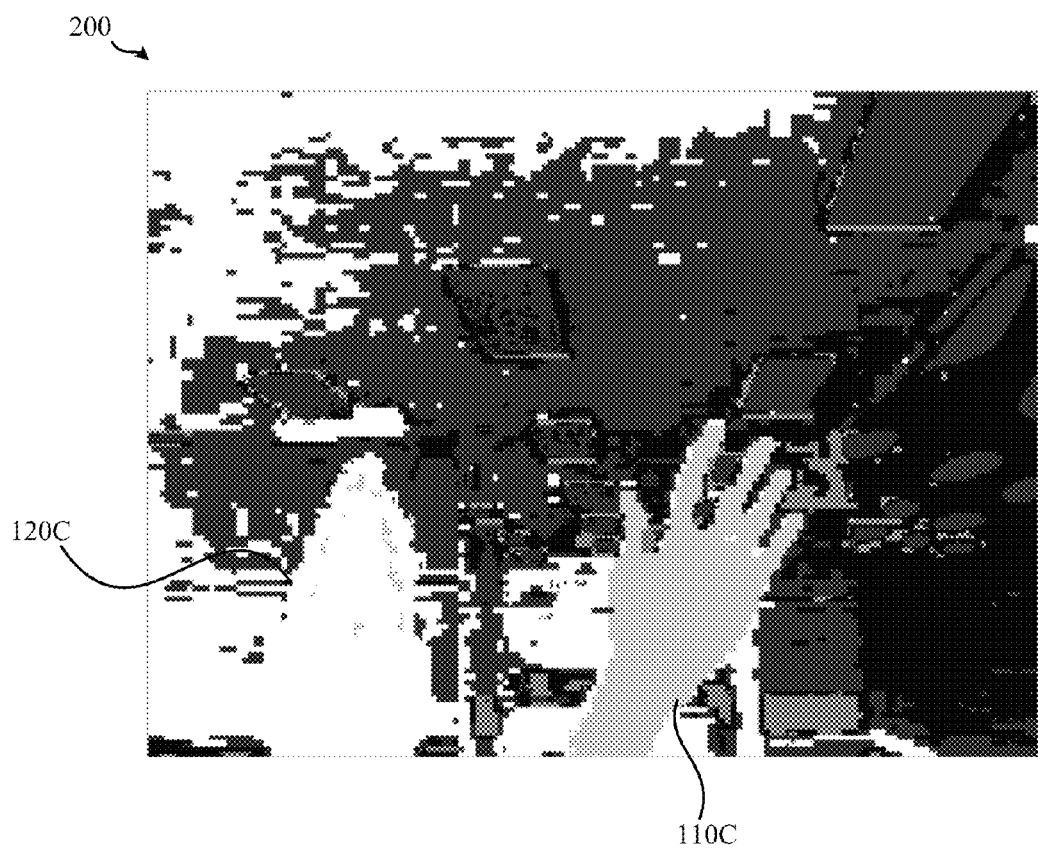
FIG. 2 illustrates an embodiment of the RGB image of FIG. 1A clustered according to color.

FIG. 2 illustrates an embodiment of an image 200 of the RGB image of FIG. 1A clustered according to color. Image 200 has been processed into the Lab color space of FIG. 1B, then clustered into five clusters. As noted previously, although the skin in most cases is assigned with an individual cluster, occasionally some spots in the background with almost the same color as skin may be included in the same cluster. For example, hand 110C which corresponds to hand 110 and hand 110B of FIGS. 1A and 1B is mostly isolated in its own color cluster, with only a small number of pixels being part of the cluster that are associated with another object, such as a few pixels of jacket 120C, which corresponds to jacket 120 of FIG. 1A and jacket 120B of FIG. 1B. Depending on the application of the proposed algorithm, these spots may be discarded or ignored. For example, when techniques provided herein are utilized to communicate with a desktop or a laptop computer on a desk/table, one could expect the hand to be close to the computer screen and the camera in its proximity. Therefore, spots in the background with almost the same color as skin can be discarded based on their size.

To help determine which cluster includes a hand (or some other object to be tracked), a tracking point may be assigned to each cluster, where the tracking point represents a combined location of some or all of the color cluster's pixels within the image. When determining a combined location, isolated spots, such as spots smaller than a threshold size (e.g., number of pixels) may be ignored. A tracking point can be, for example, a "center of gravity," a median, or the statistical average location within the image of each color cluster, based on x and y coordinates of each pixel in the color cluster. Thus, when a cluster moves in a particular direction over a series of images, its center of gravity moves in a similar direction. Therefore, for the hand of image 200, a center of gravity for the cluster containing the hand can be expected to move in the same direction as the hand, if the hand has moved in later captured images. By tracking the movements of each tracking point of a clustered image and comparing the movement of the tracking points with stored representations of gestures, a gesture recognition system may recognize gesture inputs made by a user via the hand.

In some embodiments, a single tracking point is used for each cluster of a clustered image. According to other embodiments, multiple tracking points can be used for each cluster. Multiple tracking points may be useful when other objects (e.g., a user's face) are in the same color cluster as the object to be tracked (e.g., the user's hand). For example, two physical positions for each cluster can be determined, based on the x (horizontal) and y (vertical) coordinates of member pixels of that cluster. According to some embodiments, two (or more) positions of a cluster may be detected and may utilize multiple tracking points accordingly. For example, if two separate regions within an image are part of the same color cluster, but the two regions are each greater than a threshold size and are separate from each other, each region may be assigned a tracking point. Such arrangements may be useful if two objects of the same color (e.g., a face and a hand) are present in captured images, but only one of the objects (e.g., the hand) performs a gesture. Such arrangement may also be useful if two objects of the same color (e.g., a left hand and a right hand) are present in the captured images and performing two separate gestures or performing disparate motions that correspond to a single gesture when interpreted together (e.g., bring the hands together or apart to effect a zoom command).

To determine multiple tracking points, the x coordinates of all member pixels of a color cluster can be sorted. For example, in an embodiment employing two tracking points for a color cluster, the x coordinates of all pixels in a color cluster may be sorted to derive two coordinates to represent the x coordinates of the two tracking points, similar to the median of a set of values. Two y coordinates can be determined in the same manner.

According to some embodiments, two tracking points are determined by selecting p and 1−p percent along the sorted coordinates. For example, where p=0.1, a first tracking point can be located at a position on the x axis such that 10% of the pixels in the corresponding color cluster are to the left of the first tracking point. In a similar fashion, a second tracking point can be located at a position on the x axis such that 90% of the pixels in the corresponding color cluster are to the left of the second Tracking Point. Y coordinates can be determined in the same manner.

Figure 3:
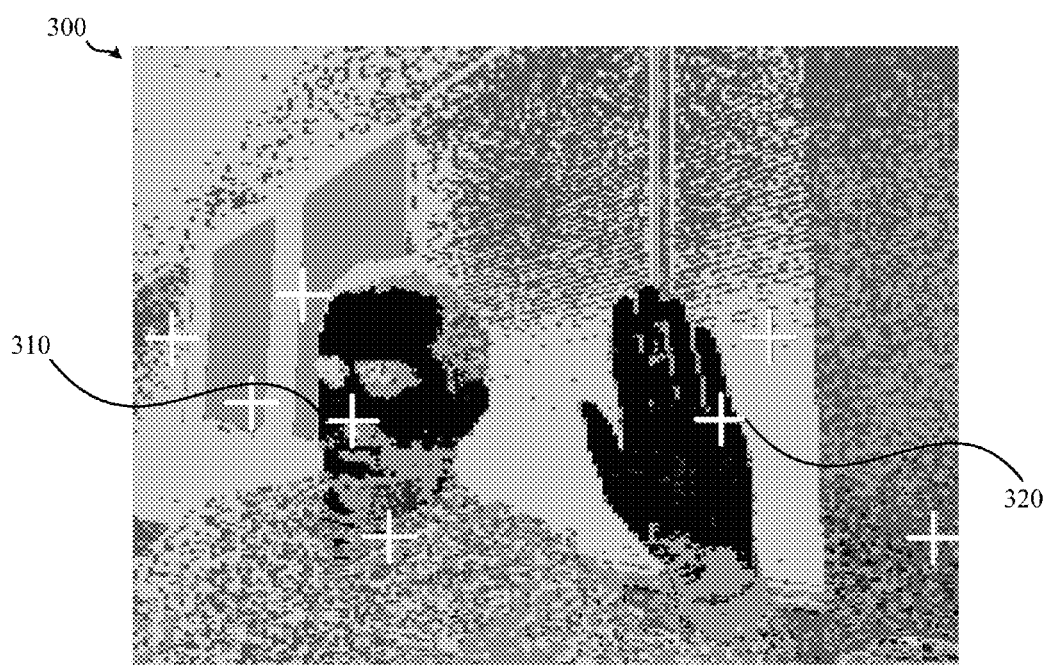
FIG. 3 illustrates an embodiment of a clustered image with multiple tracking points for each color cluster present in the image.

FIG. 3 illustrates an embodiment of a clustered image 300 with multiple tracking points for each color cluster present in the image. In clustered image 300, two tracking points are used for each color cluster. These tracking points were selected using p and 1−p percent along the sorted coordinates for the X coordinates. In this illustrated embodiment, p=0.1. In particular, some of the five clusters in FIG. 3 has two tracking points, represented by crosshairs: one tracking point is located at 10 percent along the clustered x coordinates, and another tracking point is at 90 percent along the clustered x coordinates. In FIG. 3, the color cluster having the darkest color contains the majority of pixels that correspond to human skin. The two tracking points of this color cluster are tracking point 310 and tracking point 320. As seen in clustered image 300, tracking point 310 is near the face portion of the color cluster and tracking point 320 is near the hand portion of the color cluster.

While p and 1−p were used to determine the x coordinates of the tracking points, the y coordinates may be determined via some other method, such as by using a median or mean of all pixels in the pixel group. In some embodiments, the p and 1−p methodology may also be used for y coordinates. In other embodiments, the y coordinate may be inconsequential, such as when only a horizontal swipe gesture (or some other gesture that exclusively relies on movement along the x-axis) is to be detected.

The use of multiple tracking points may be more reliable and less sensitive to noise and noisy edges of pixel groups. For example, from image to image, some pixels may shift between being part of one color cluster and another. For calculating the coordinates of tracking points the median, the average, or other techniques may be used. Similar techniques can be employed to extract two points for vertical gestures such as swipe up and down. Depending on desired functionality, anticipated object movement, and/or other factors, different techniques may be utilized to determine the x coordinate for each tracking point than the y coordinate, and/or different techniques may be utilized to determine the tracking points for different color clusters.

A number of machine learning and statistical algorithms, such as Hidden Markov Models (HMMs) and graph matching, can be utilized to recognize object (e.g., hand) movements. However, alternative techniques can be utilized for certain gestures—such as swipe left, right, up, and down—for example when there are not enough salient features for training those algorithms. As provided herein below, the image processing and tracking point techniques described above may be utilized in either case.

For recognizing object movement trajectories such as swipe, circle, triangle, and alphabet letters, statistical algorithms can be employed, which can be trained and used for recognition. Hidden Markov Models, for example, can be used for this purpose.

Figure 4:
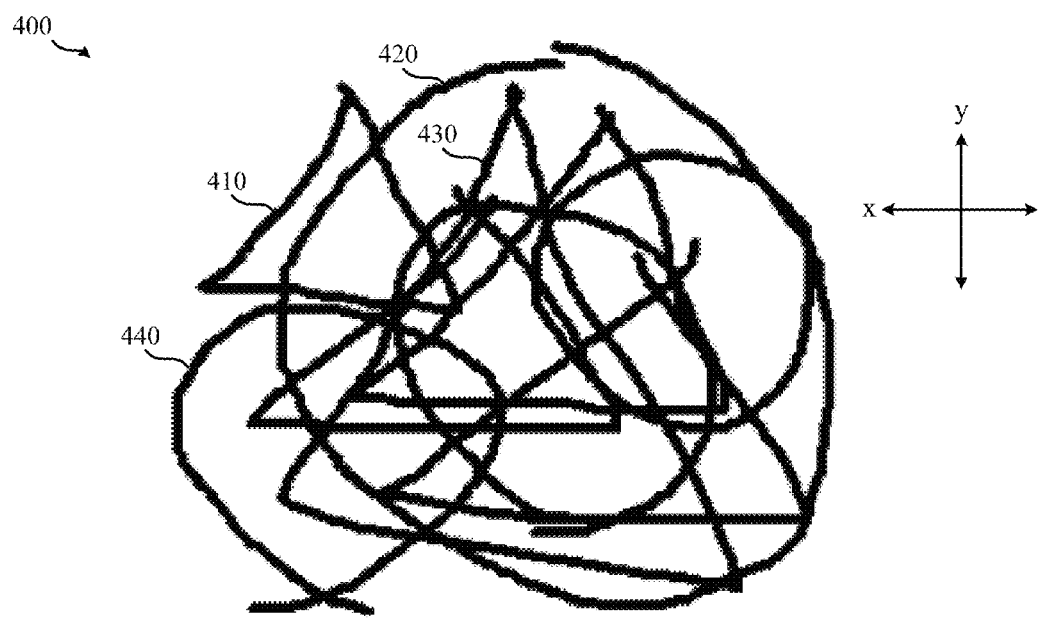
FIG. 4 illustrates an embodiment of a coordinate system onto which recorded gestures are projected for extraction.

In order to extract gesture features, a number of gesture samples can be recorded for each gesture. These gestures may be performed by different people to include spatial and temporal variations. For example, different people when performing the same gesture may perform it at different speeds in a different size. An example is a circle gesture. A first person may take 2 seconds to perform the gesture, with a radius of eight inches. A second person may take 3 seconds to perform the gesture, with a radius of a foot. Because the trajectories are of interest, the features of the movement of an object that are spatial and temporal may be extracted. According to some embodiments, these features may be extracted by projecting recorded gestures onto a fixed coordinate plane using raw X and Y coordinates as shown in FIG. 4. FIG. 4 illustrates an embodiment of a coordinate system 400 onto which recorded gestures are projected for extraction.

Within FIG. 4, the trajectories of multiple tracking points that follow movement of color clusters that performed multiple gestures are illustrated on coordinate system 400. In coordinate system 400, circle gestures and triangle gestures are present. For instance, triangle 410 represents movement of a tracking point of a color cluster across multiple images; circle 420 represents movement of a second tracking point of a second color cluster across multiple images. Triangle 410 may have been performed in a gesture that was temporally shorter or longer and spatially smaller than triangle 430. Circle 440 may have been performed in a gesture that was temporally shorter or longer and spatially smaller than circle 420.

Figure 5:
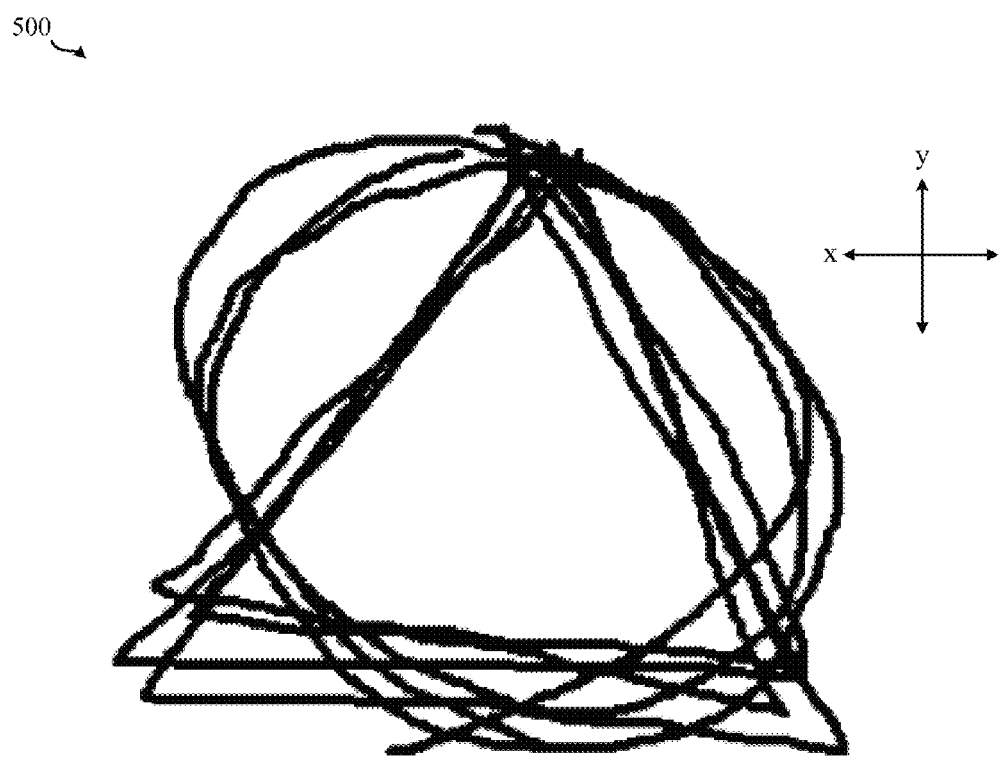
FIG. 5 illustrates an embodiment of a coordinate system onto which spatially normalized gestures are projected for extraction.

The trajectories of coordinate system 400 can be spatially normalized, then projected onto a single coordinate system. One way of doing this is to rescale and translate each recorded trajectory so that the set of X and Y coordinates of the tracking point representing the position of the object in all recorded samples have equal standard deviations as shown in FIG. 5. FIG. 5 illustrates an embodiment of a coordinate system 500 onto which spatially normalized gestures are projected for extraction. To normalize a trajectory, for example, the maximum to minimum variation of X and Y coordinates may be calculated separately. Each of the X coordinates may be divided by the calculated X variation; each the Y coordinates may be divided by the calculated Y variation. After normalizing the size of a trajectory, the trajectory may be repositioned such that its "center-of-gravity" is positioned at, for example, coordinates of (1, 1) by subtracting or adding appropriate values. It may be possible to apply this technique to all the samples in the training phase and the trajectories in the recognition phase; it can only reduce variations and therefore simplify training and classification processes.

A set of code vectors or an alphabet can then be extracted from the recorded trajectories. According to some embodiments, this extraction can be performed with a vector quantization (VQ) technique. By applying VQ to the x and y coordinates of the sampled positions along all the trajectories, a limited set of code vectors is extracted. Then, for each sample of a gesture, the sequence of code vectors along its trajectory is extracted. For each gesture, a left to right HMM is considered and trained using all recorded samples of that gesture. The algorithm, explained in U.S. patent application Ser. No. 12/194,780, which is incorporated by reference herein in its entirety, as if set forth in full in this document, for all purposes, may also be used to train a set of median-based criteria for rejecting gestures not defined in a gesture vocabulary or library.

Tracking points can be tracked and analyzed to determine whether one or more recognized gestures have been performed. For example, a tracking point for a color cluster corresponding to an object (e.g., a hand) performing a gesture will make recognizable motions, while tracking points for other color clusters (e.g., those corresponding to objects that are motionless or are making unrecognized movements) are unlikely to make recognized motions. In this manner, objects making recognized gestures can be identified, without first identifying an object that is to perform the gesture. For example, instead of first identifying a hand and then tracking the hand to determine whether a gesture has been performed, certain embodiments described herein may be used to first determine whether a gesture has been performed and then to determine whether a hand is present in the area in which a gesture is performed. Such embodiments may reduce processing and/or power consumption, and may be able to more accurately identify objects such as hands. Features of the object, such as features of an identified hand, may thereafter be initialized and/or tracked.

As discussed above, the center of gravity of each color cluster or multiple tracking points (e.g., two, four, etc.) of left and right (and/or top and bottom) sides of each color cluster can be extracted. A vector can be constructed for each of these points for recording the last n positions. These vectors are referred to herein as History Vectors (HV). Each HV can be analyzed with the trained HMMs and the rejection algorithm to see if a known (e.g., trained) pattern (e.g., swipe, circle, triangle, wave) associated with a gesture is present in them. For the pattern that best matches the movement, passes the rejection algorithm, and produces the highest likelihood, a gesture detected signal can be generated with an identification of matched pattern/gesture. Others that may be included are a likelihood or probability that the gesture was accurately detected, a timestamp, an identification of the color cluster, and an indication of the associated tracking point. Extraction in this manner may make it unlikely that random changes in the position of a tracking point of a color cluster other than the color cluster associated with the object to be tracked pass the rejection algorithm and produce a high likelihood of matching one of the patterns in the vocabulary.

An issue that may arise when using fixed length HVs is that, if a user moves their hand (or other object) fast or slow while performing a gesture, the HV may contain either too few or too many observations to match to stored, trained patterns. This issue may be overcome by considering the velocity of movement to adjust the HVs' length. The mean or median velocity of a tracking point in a fixed number of last observations can determine the temporal length of HVs. The higher the average velocity is observed, the shorter the HVs' length; the lower the average velocity is observed, the longer the HVs' length. Velocity of the movement of a tracking point can be measured by using the motion Kalman filter as explained in U.S. Pat. No. 7,379,563, which is hereby incorporated by reference in its entirety, as if set forth in full in this document, for all purposes.

These gesture recognition techniques can be expanded beyond situations in which a single color cluster is assigned to the hand (or other object) controlled by a single user. Some embodiments may utilize these techniques to recognize gestures made by multiple objects (e.g., both hands of a user) and/or multiple users (e.g., the hands of two or more users). Moreover, for embodiments in which tracking points for multiple color clusters perform similar motions, for example when the colors of a user's hand are assigned to multiple color clusters, these movements may be analyzed and/or combined, enabling a system to select and/or compute one or more of the movements that may provide the best results for gesture recognition. In one embodiment, when two adjacent clusters appear to perform gestures, a gesture may be detected only when the two apparent gestures match. In other embodiments, both/all of the apparent gestures may be detected. In still other embodiments, a confidence of each apparent gesture may be determined or received, and the detected gesture selected based on the respective confidences. For example, the apparent gesture with the highest confidence may be selected. When several clusters which are distanced from each other appear to each perform a gesture, it may be determined whether to accept all of the gestures or a subset of the gestures. For example, accepting a plurality of the gestures may allow for bimanual gesture input and/or input from multiple users. Selecting a single gesture may increase accuracy of operation of a device detecting the gestures in some embodiments and/or provide for control of the device by a single user. In some embodiments, an object corresponding to a cluster that appears to have performed a gesture may be determined, and the object determination may be used to select a gesture to accept. For example, gestures that appear to have been performed by a hand as opposed to another object may be selected in some embodiments.

Because certain gestures, such as a swipe (e.g., movement of an object from left to right, right to left, up to down, or down to up) may not entail enough salient features to be used for training statistical algorithms such as HMMs, some embodiments can utilize a different method to detect these gestures and reject irrelevant movements.

As discussed above, HVs for the one or more tracking points of each color cluster can be created. Each of these HVs can be analyzed for detecting swipe gestures. When swiping, the hand may move fast in a certain direction. By analyzing the velocity of the hand, it may be determined whether, during a swipe movement, the velocity stays consistently high across a large portion of the movement.

Figure 6:
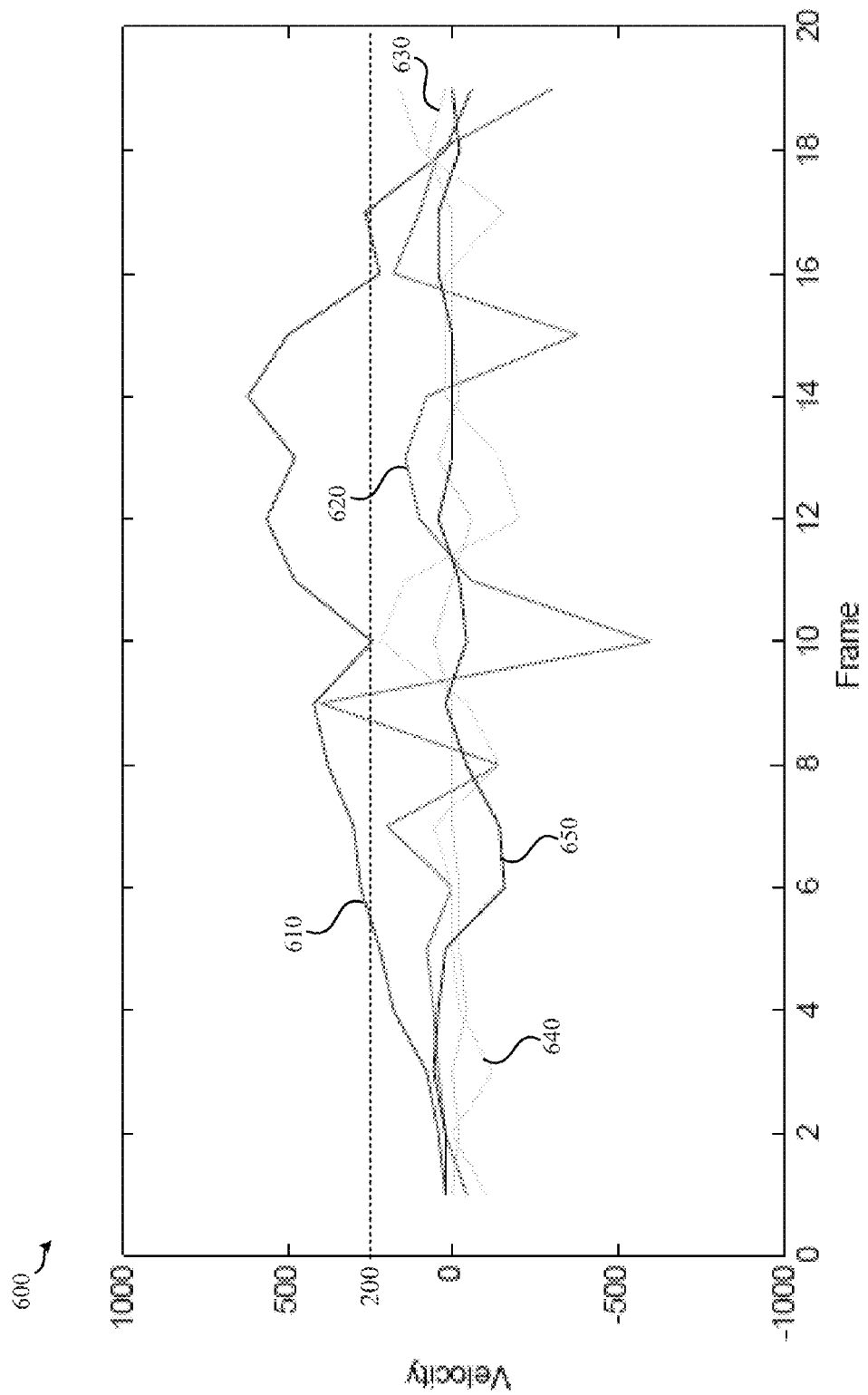
FIG. 6 illustrates an embodiment of a graph of five tracking points, each tracking point being assigned to a different color cluster.

FIG. 6 illustrates an embodiment of a graph 600 of five tracking points, each tracking point being assigned to a different color cluster. History Vectors of 20 frames in length are created. History Vector 610 stays higher than 200 for about 12 frames while other HVs have low averages and/or inconsistent velocity changes. Table 1 displays the average velocities and standard deviations of the velocities in this experiment for the five HVs:

TABLE 1

FIG. 6 Tracking Points

| History Vector | Average Velocity | Standard Deviation |
| --- | --- | --- |
| 610 | 275.8 | 194.6 |
| 620 | −4.2 | 218.9 |
| 630 | 1.05 | 31.4 |
| 640 | −9.5 | 111.9 |
| 650 | −6.3 | 56.2 |

Because a hand (or other object) may move fast during a swipe, a threshold can be trained as the minimum required speed for a swipe gesture. The standard deviation of the velocities in each of the HVs is also calculated. An average (or median) velocity higher than the trained threshold accompanied by a relatively small standard deviation is considered to be a swipe gesture. The criteria for standard deviation may also be trained through recording a number of swipe and non-swipe training movements. To create a single criterion for making sure that the average velocity is large and, possibly, that the standard deviation is small, the average velocity is multiplied by the inverse of the standard deviation. The result is monitored for each HV. The HV that is associated with a swipe gesture being performed may have the highest speed multiplied by the inverse of standard deviation compared to other concurrent history vectors, high speed (higher than the trained threshold) and small standard deviation (smaller than the trained threshold for the standard deviation). A movement recorded in an HV can be recognized as a swipe gesture if it passes all these steps. Referring to Table 1, because history vector 610 has the highest value (average velocity is multiplied by the inverse of the standard deviation) of the HVs, it can be interpreted as a swipe if average velocity (275.8) is above a trained threshold and standard deviation (194.6) is below a trained threshold.

Figure 7:
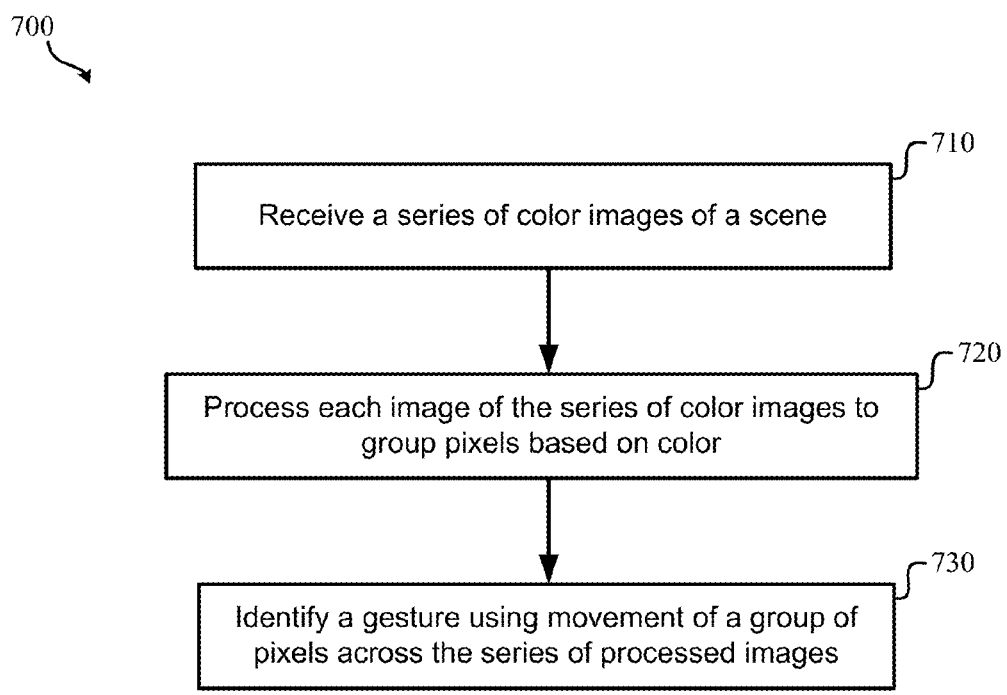
FIG. 7 illustrates an embodiment of a method for recognizing gestures.

FIG. 7 illustrates an embodiment of a method 700 for recognizing gestures. Method 700 may be performed using the previously detailed arrangements for detecting and identifying movement and gestures. Method 700 may be performed without previous training and without identifying an object (e.g., a hand) that is eligible to perform a gesture in some embodiments. Rather, in method 700 any color cluster may perform a gesture. Steps of method 700 may involve using a computer system, such as computer system 1000 of FIG. 10. Means for performing steps of method 700 include one or more computer systems.

At step 710, a series of color images of a scene may be received. In these images may be an object that is performing a gesture. These images may be received from an image capture device, such as a camera. A series of color images may be captured, such as 15 or 30 frames per second. The images may be in color but may not have any depth information. For instance, each pixel of each image may not be associated with a depth value. In some embodiments, each pixel of the images received may have an RGB value. The color images may be captured using image capture device 910 of FIG. 9 and received by movement detection processing engine 920. Movement detection processing engine 920 may include one or more processors, such as processor 1010 of FIG. 10 and one or more storage devices, such as storage device 1025 of computer system 1000 of FIG. 10.

At step 720, each image of the series of color images received may be processed. Processing each image may include identifying a number of color clusters within each image. Each pixel within an image may be classified into a color cluster. The number of different colors for color clusters may be predefined, such as five. At this point, identification of objects present within any of the series of images may not have been performed. As such, pixels of the images associated with an object that may perform a gesture are treated the same as pixels of background objects. Accordingly, pixels of an object that may perform a gesture, such as hand 110C of FIG. 2 are classified into a color cluster just as the pixels of jacket 120C are classified into a different color cluster. The color images may be processed by movement detection processing engine 920, for example by one or more of modules 921-924, and/or gesture detection processing engine 930 of FIG. 9. Movement detection processing engine 920 and/or gesture detection processing engine 930 may include one or more processors, such as processor 1010 of FIG. 10 and one or more storage devices, such as storage device 1025 of computer system 1000 of FIG. 10.

At step 730, based on movement of one or more color clusters among images of the series of images, a gesture is identified. At no point through step 730 is an object within the series of images identified in some embodiments. Rather, only movement of color clusters within the series of images may be tracked, irrespective of the objects in each color cluster. For instance, while a gesture may be performed by a hand, and a color cluster may be wholly or partially devoted to skin color, at no point is the hand identified in any of the series of images in some embodiments. A gesture may be identified by gesture detection processing engine 930 of FIG. 9. Gesture detection processing engine 930 may include one or more processors, such as processor 1010 of FIG. 10 and one or more storage devices, such as storage device 1025 of computer system 1000 of FIG. 10.

Figure 8:
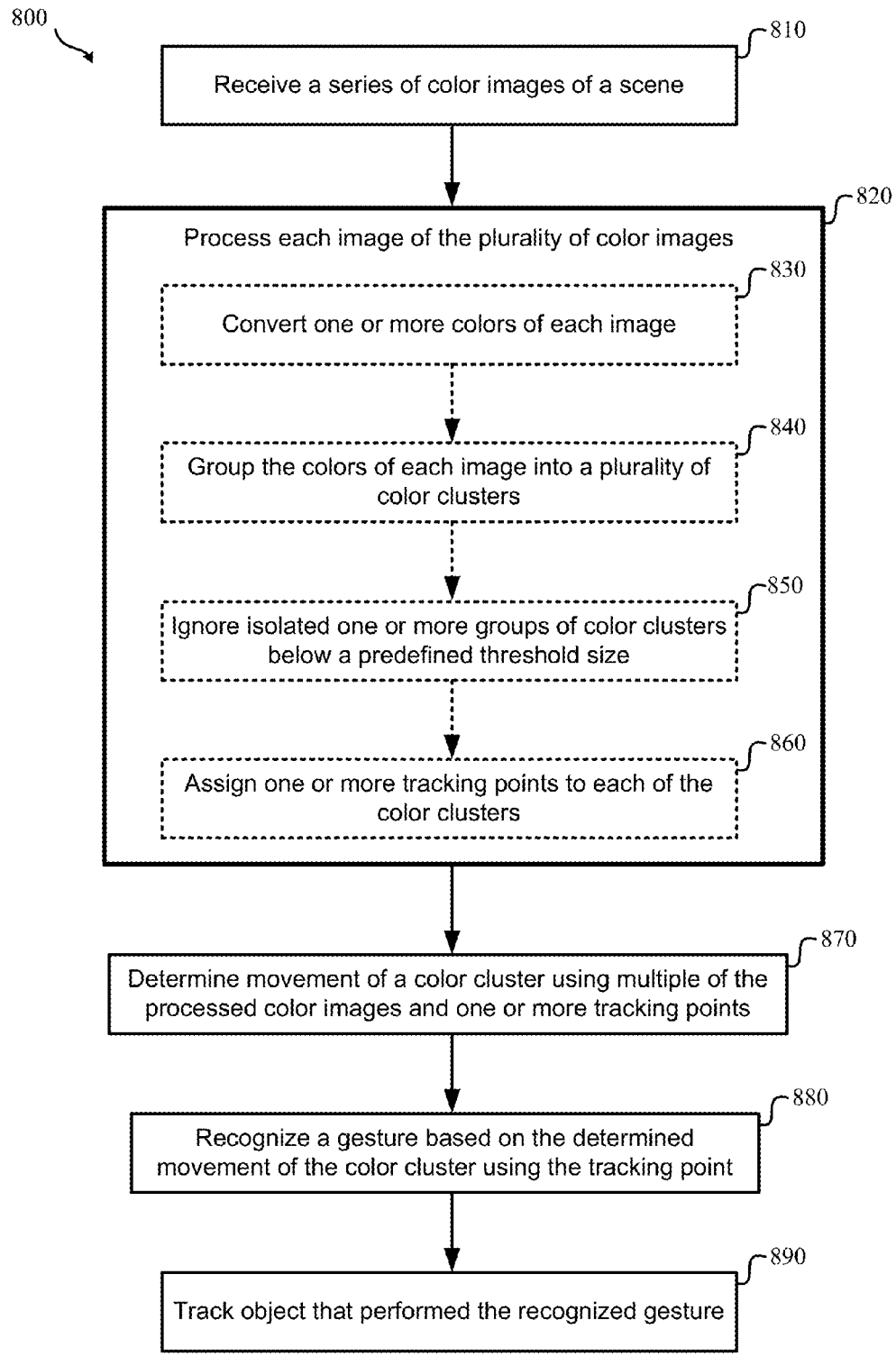
FIG. 8 illustrates another embodiment of a method for recognizing gestures.

FIG. 8 illustrates an embodiment of a method 800 for recognizing gestures. Method 800 may be performed using the previously detailed arrangements for detecting and identifying movement and gestures. Method 800 may be performed without previous training and without identifying an object (e.g., a hand) that is eligible to perform a gesture in some embodiments. Rather, in method 800, any color cluster, regardless of objects within the color cluster, may perform a gesture. Steps of method 800 may involve using a computer system, such as computer system 1000 of FIG. 10. Means for performing steps of method 800 include one or more computer systems and one or more image capture devices. Such computer system(s) could include, for example, a personal, tablet, and/or notebook computer, television, media player, smart phone, and the like. Method 800 may represent a more detailed embodiment of method 700 of FIG. 7.

At step 810, a series of color images of a scene is received. Within the scene, one or more objects may be present, including an object that is performing a gesture. Images can be received from image capture devices, such as one or more video cameras, still cameras, and/or other sensors or devices capable of providing a plurality of color images. In embodiments where a video camera is used, some frames (i.e., images) of the video may be skipped or otherwise ignored, depending on desired functionality. The determination to skip and/or ignore images can be made periodically, and may depend on any of a variety of factors such as accuracy requirements, recognizable gestures, anticipated movements, and more. The color images received at step 810 may be RGB images. The images received at step 810 may be from a single color image capture device that does not capture depth information. The color images may be captured using image capture device 910 of FIG. 9 and received by movement detection processing engine 920. Movement detection processing engine 920 may include one or more processors, such as processor 1010 of FIG. 10 and one or more storage devices, such as storage device 1025 of computer system 1000 of FIG. 10.

At step 820, each of the series of color images is processed. Processing the series of color images may include various steps, such as: converting colors of the image; grouping colors of the converted images; and assigning tracking points to color clusters. In some embodiments, only some of the series of color images are processed, others may be skipped or otherwise ignored. The color images may be processed by movement detection processing engine 920, for example by one or more of modules 921-924, and/or gesture detection processing engine 930 of FIG. 9. Movement detection processing engine 920 and/or gesture detection processing engine 930 may include one or more processors, such as processor 1010 of FIG. 10 and one or more storage devices, such as storage device 1025 of computer system 1000 of FIG. 10.

At step 830, of the images processed, one or more colors of each of the series of color images may be converted. In some embodiments, the RGB images are converted into the Lab color space. While some embodiments include converting RGB images into Lab images as described previously, other embodiments may not employ such processing. Embodiments may not convert the colors of each image if, for example, the color images received at step 810 were already in the desired color space (e.g., Lab, RGB, etc.). Step 830 may be performed by movement detection processing engine 920 of FIG. 9, for example using a color converting engine 921. Movement detection processing engine 920 may include one or more processors, such as processor 1010 of FIG. 10 and one or more storage devices, such as storage device 1025 of computer system 1000 of FIG. 10.

At step 840, the colors of each image are grouped into multiple color clusters. As indicated previously, the number of color clusters can vary, depending on desired functionality. As an example, embodiments may include 2, 3, 4, 5, 10, 15, 20 or more color clusters. Any number of color clusters within these discussed numbers may also be possible. The number of color clusters can depend on the color space utilized (e.g., RGB, Lab, etc.), the number of colors of the image, lighting, etc. The number of color clusters may be predefined or may be adjusted based on characteristics of the scene of which the images are captured. Pixels of a color cluster may solely be selected based on color; brightness may not be a factor. In other embodiments, brightness may be used to determine the color cluster of a pixel. Further, proximity to other pixels of the same color may not be a factor. As such, pixels of a single color cluster may be spread in multiple locations in an image. For example, referring to FIG. 3, pixels associated with the face and hand are part of the same color cluster but are isolated from each other in clustered image 300. At step 840, every pixel within each processed image may be assigned to a color cluster. As such, no particular object within the image is tracked at or before step 840 in some embodiments. Rather, in some embodiments, the only characteristic of the processed images investigated is color. Further, each color is treated similarly without preference being given to any particular cluster or brightness. Therefore, an object that may perform a gesture (e.g., a user's hand) is processed the same as an object that may not perform a gesture (e.g., a plant). Step 840 may be performed by movement detection processing engine 920 of FIG. 9, for example using a clustering engine 922. Movement detection processing engine 920 may include one or more processors, such as processor 1010 of FIG. 10 and one or more storage devices, such as storage device 1025 of computer system 1000 of FIG. 10.

At step 850, various pixels may be discarded or otherwise ignored from further processing. Pixels which are not in a neighborhood (e.g., a 5×5 neighborhood) of a predefined number of other pixels that are part of the same color cluster may be discarded from further processing. Such discarding of stray pixels may be useful to discard small objects unlikely to perform a gesture and/or ignore noise. The color images may be processed by movement detection processing engine 920 of FIG. 9, for example using a filtering engine 923. Movement detection processing engine 920 may include one or more processors, such as processor 1010 of FIG. 10 and one or more storage devices, such as storage device 1025 of computer system 1000 of FIG. 10.

At step 860, one or more tracking point may be assigned for each color cluster of the plurality of color clusters. For example, two tracking points may be assigned to a color cluster using the p and 1−p methodology, as previously detailed in relation to FIG. 3. In other embodiments, the motion of color clusters may be tracked utilizing techniques that do not include tracking points. In some embodiments, one or more features of an image other than color may be grouped or clustered. For example, pixels of each image may be clustered based on a luminance of the pixels. In some embodiments, edges or detected key features may be grouped. Those of skill in the art will appreciate that colors may be grouped into a plurality of clusters, as described above, and that other features may instead or in addition be grouped. Thus, description herein of color clusters may instead or in addition refer to groupings or clusters of other elements or features. Step 860 may be performed by movement detection processing engine 920 of FIG. 9, for example using a tracking point assignment engine 924. Movement detection processing engine 920 may include one or more processors, such as processor 1010 of FIG. 10 and one or more storage devices, such as storage device 1025 of computer system 1000 of FIG. 10.

At step 860, every color cluster in each processed image may be assigned one or more tracking points. As such, no particular object within the image is tracked at or before step 860 in some embodiments. Each color cluster may be treated similarly without preference being given to any particular group (regardless of the real-world object(s) the color cluster represents). Therefore, a color cluster representing an object that may perform a gesture (e.g., a user's hand) is processed the same as a color cluster that may not perform a gesture (e.g., a plant) in some embodiments. Step 860 may be performed by movement detection processing engine 920 of FIG. 9. Movement detection processing engine 920 may include one or more processors, such as processor 1010 of FIG. 10 and one or more storage devices, such as storage device 1025 of computer system 1000 of FIG. 10.

At step 870, movement of the object is determined from the processed color images. As explained previously, the determination of the movement can be based on movement of one or more tracking points of color clusters and/or movement of one or more color clusters among the processed images. History vectors and/or other movement tracking mechanisms may be employed to track movement in and/or extract movement from the processed color images. At no point through step 870 is any particular object within the series of images identified in some embodiments. As such, while movement of color clusters may be determined, what object or objects make up any of the color clusters may not be determined in some embodiments. Step 870 may be performed by movement detection processing engine 920 of FIG. 9, for example using a tracking point assignment engine 924. Movement detection processing engine 920 may include one or more processors, such as processor 1010 of FIG. 10 and one or more storage devices, such as storage device 1025 of computer system 1000 of FIG. 10.

At step 880, a gesture may be recognized based on the determined movement of step 870. As described herein, any of a variety of gesture recognition techniques may be utilized. For example, the movement data determined at step 870, such as an HV, may be compared to stored representations of predefined gestures. Different gesture recognition techniques may be utilized, depending on the detected motion. For example, a technique may be utilized that analyzes velocity and/or a standard deviation of velocity to determine if a swipe gesture was performed. On the other hand, a trained statistical algorithm (e.g., an HMM) may be utilized to determine if a more complex motion (e.g., a circular motion) was performed. Some embodiments may execute a variety of techniques simultaneously to help ensure gestures are accurately recognized. Following a recognized gesture, an output may be provided to some other device, system, or software (e.g., another executing application) that indicates the gesture that has been performed. Other information may also be included, such as coordinates of where the gesture was performed and its direction within the series of images and/or a likelihood that the recognition of the gesture is accurate. A gesture may be identified by gesture detection processing engine 930 of FIG. 9. Gesture detection processing engine 930 may include one or more processors, such as processor 1010 of FIG. 10 and one or more storage devices, such as storage device 1025 of computer system 1000 of FIG. 10.

At step 890, in some embodiments, the object that performed the gesture recognized at step 880 may begin being tracked. For example, a gesture recognized at step 880 may serve as an engagement gesture. The object (e.g., user's hand) that performed the engagement gesture may then be tracked. Such tracking may be to monitor the object for additional gestures and/or keep a focus of a camera on the user that performed the gesture. The object that is tracked at step 890 may be identified to be a particular type of object (e.g., hand); or, it may only be known that the object was part of a color cluster that performed a recognized gesture at step 880. An engagement gesture may be a gesture that signals the user performing the gesture desires to control a session with the system. A user performing an engagement gesture may be tracked for future gestures (possibly to the exclusion of other persons within captured images). Step 890 may be performed by movement detection processing engine 920 and/or gesture detection processing engine 930 of FIG. 9. Movement detection processing engine 920 and/or gesture detection processing engine 930 may include one or more processors, such as processor 1010 of FIG. 10 and one or more storage devices, such as storage device 1025 of computer system 1000 of FIG. 10. In some embodiments, a limited number of gestures may be recognized until a certain engagement gesture or one of a plurality of engagement gestures is detected. In such embodiments, other motions or gestural inputs may be ignored until the engagement gesture is recognized. In some embodiments, recognition of the engagement gesture causes certain tracking functions to be initialized and/or gesture models to be loaded, thereby allowing the detection of an greater number of gestures.

It should be appreciated that the specific steps illustrated in FIG. 8 provide an example of methods for recognizing gestures made by an object. Alternative embodiments may include alterations to the embodiments shown. For example, alternative embodiments may include particular methods for converting image colors and/or tracking movement. Other embodiments may include identifying an object based on a recognized gesture. Furthermore, additional features may be added or removed depending on the particular applications. One of ordinary skill in the art would recognize many variations, modifications, and alternatives.

Figure 9:
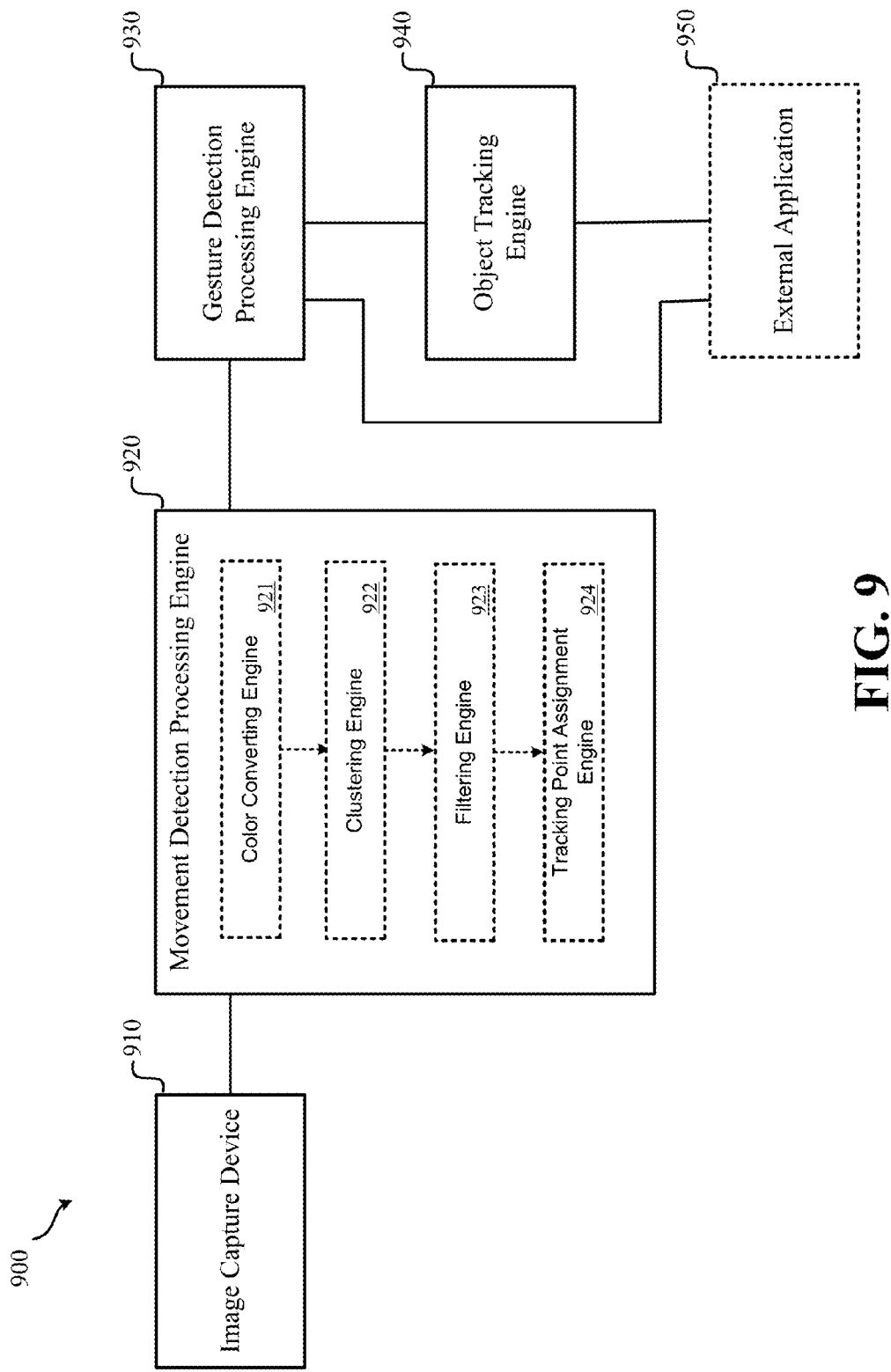
FIG. 9 illustrates an embodiment of a system for recognizing gestures.

FIG. 9 illustrates an embodiment of a system 900 for recognizing gestures. System 900 may be used to perform the previously detailed methods for recognizing gestures. System 900 may include: an image capture device 910, a movement detection processing engine 920, a gesture detection processing engine 930, and object tracking engine 940.

Image capture device 910 may capture a series of color images of a scene. Image capture device 910 may include one or more video cameras and/or still cameras. Each of the cameras may capture color images.

Movement detection processing engine 920 may be implemented using hardware, firmware, and/or software executed by one or more computerized devices (including computer systems) to receive color images from image capture device 910 and process some or all of the images. Movement detection processing engine 920 may further convert the colors of the images to another format, such as Lab. Movement detection processing engine 920 may group colors into a number of color clusters. Movement detection processing engine 920 may determine one or more pixels of images to ignore. Movement detection processing engine 920 may also assign one or more tracking points to each color cluster in the images. Various submodules may be present within movement detection processing engine 920, each of which may be implemented using hardware, software and/or firmware.

Color conversion engine 921 may convert one or more colors of each image of a series of color images. In some embodiments, the RGB images are converted into the Lab color space. While some embodiments include converting RGB images into Lab images as described previously, other embodiments may not employ such processing. Engine 921 may be implemented using hardware, software and/or firmware.

Clustering engine 922 may group colors of images into multiple color clusters. The number of color clusters can vary, depending on desired functionality. As an example, embodiments may include 2, 3, 4, 5, 10, 15, 20 or more color clusters. Any number of color clusters within these discussed numbers may also be possible. The number of color clusters can depend on the color space utilized (e.g., RGB, Lab, etc.), the number of colors of the image, lighting, etc. The number of color clusters may be predefined or may be adjusted based on characteristics of the scene of which the images are captured. Pixels of a color cluster may solely be selected based on color; brightness may not be a factor. In other embodiments, brightness may be used to determine the color cluster of a pixel. Further, proximity to other pixels of the same color may not be a factor. As such, pixels of a single color cluster may be spread in multiple locations in an image. For example, referring to FIG. 3, pixels associated with the face and hand are part of the same color cluster but are isolated from each other in clustered image 300. Each color may be treated similarly without preference being given to any particular cluster or brightness. Therefore, an object that may perform a gesture (e.g., a user's hand) may be processed the same as an object that may not perform a gesture (e.g., a plant). Engine 922 may be implemented using hardware, software and/or firmware.

Filtering engine 923 may ignore various pixels from further processing. Pixels which are not in a neighborhood (e.g., a 5×5 neighborhood) of a predefined number of other pixels that are part of the same color cluster may be discarded from further processing. Such discarding of stray pixels may be useful to discard small objects unlikely to perform a gesture and/or ignore noise. Engine 923 may be implemented using hardware, software and/or firmware.

Tracking point assignment engine 924 may assign one or more tracking point to each color cluster of the plurality of color clusters. For example, two tracking points may be assigned to a color cluster using the p and 1−p methodology, as previously detailed in relation to FIG. 3. In some embodiments, one or more features of an image other than color may be grouped or clustered. Engine 924 may be implemented using hardware, software and/or firmware.

The above description indicates that various components may be implemented using hardware, software and/or firmware. In some embodiments, this may involve components being functionally performed by one or more image signal processors or some other form of video front-end. In some embodiments, components may be functionally performed by an application processor.

Gesture detection processing engine 930 may be implemented using hardware, firmware, and/or software executed by one or more computerized devices (including computer systems) to receive positions of color clusters and/or tracking points from movement detection processing engine 920. It should be understood that movement detection processing engine 920 and gesture detection processing engine 930 may be implemented as part of the same hardware, firmware, and/or software. Gesture detection processing engine 930 may create history vectors from the data received from movement detection processing engine 920 or may otherwise determine movement of color clusters. Gesture detection processing engine 930 may compare the history vectors or other representation of the determined movement to stored representations of one or more gestures to recognize a gesture. Gesture detection processing engine 930 may provide an output that a gesture has been performed (possibly with additional information) to object tracking engine 940 and/or external application 950.

Object tracking engine 940 may track the object that performed the gesture recognized by gesture detection processing engine 930. Object tracking engine 940 may be implemented using hardware, firmware, and/or software executed by one or more computerized devices (including computer systems) to receive indications of recognized gestures and the color cluster that performed the gesture from gesture detection processing engine 930. It should be understood that object tracking engine 940, movement detection processing engine 920, and/or gesture detection processing engine 930 may be implemented as part of the same hardware, firmware, and/or software. Object tracking engine 940 may provide an output to external application 950.

External application 950, which may be executed using the same or different hardware and/or firmware from the previously detailed engines, may use the output from gesture detection processing engine 930 and/or object tracking engine 940 as a command or some other form of input.

It should be understood that system 900 may be expanded into additional components or condensed into fewer components.

Figure 10:
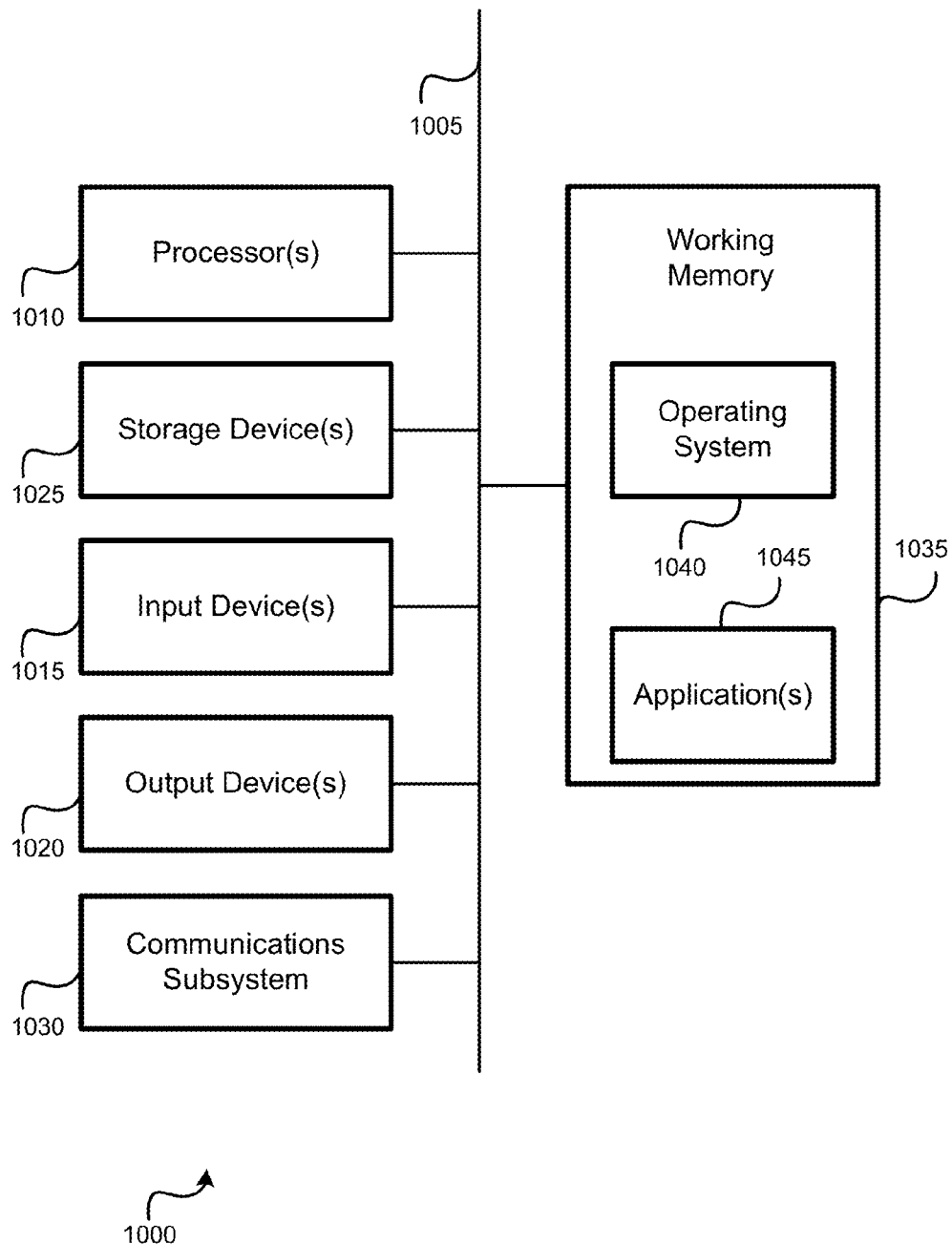
FIG. 10 illustrates an embodiment of a computer system.

FIG. 10 illustrates an embodiment of a computer system 1000, which may be incorporated into and/or communicatively coupled with a gesture-recognition system. One or more components of the computer system 1000 could be shared between different devices, such as a camera, smart phone, tablet, personal computer, or other computing device. In some embodiments, software and other applications could be run on separate devices communicatively linked with each other. In other embodiments, a gesture-recognition system may have some or all of the computer system 1000 integrated therewith.

FIG. 10 provides a schematic illustration of one embodiment of a computer system 1000 that can perform the methods provided by various other embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include a processing unit, such as processor(s) 1010, which can include without limitation one or more general-purpose processors, one or more special-purpose processors (such as digital signal processing chips, graphics acceleration processors, and/or the like), and/or other processing means, which can be utilized to perform at least a portion of the gesture recognition and/or image processing techniques described herein. Specifically, the processor(s) 1010 and/or other components of the computer system 1000 can be configured to perform the steps of the method 700 illustrated in FIG. 7 and/or the method 800 illustrated in FIG. 8. Hardware elements may also include one or more input devices 1015, which can include without limitation a camera or other image-capturing means, a touch pad, keyboard, microphone, and/or the like. One or more output devices 1020 are also included. These output devices can include one or more displays and/or other display means, speakers, and/or other devices.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which, can include without limitation a camera, a mouse, a keyboard, and/or the like; and one or more output devices 1020, which can include without limitation a display device, a printer, and/or the like. An input camera may be utilized, for example, to provide the plurality of color images for processing, as shown by the method 700 in FIG. 7 and/or the method 800 in FIG. 8.

The computer system 1000 may further include (and/or be in communication with) one or more non-transitory storage device(s) 1025, which can comprise, without limitation, local and/or network accessible storage, and/or can include, without limitation, a disk drive, a drive array, an optical storage device, a solid-state storage device, such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or other receiving means. The communications subsystem 1030 may permit data to be exchanged with a network (such as the network described below, to name one example), other computer systems, and/or any other devices (e.g. a camera) described herein. An output interface can be utilized, for example, to indicate the recognition of a gesture to another device, computer system, display, etc. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1000, and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the non-transitory storage device(s) 1025. Merely by way of example, execution of the sequences of instructions contained in the working memory 1035 might cause the processor(s) 1010 to perform one or more procedures of the methods described herein. For example, the processor(s) 1010 and/or other components of the computer system 1000 can be configured to perform the steps of the method 700 illustrated in FIG. 7 and/or the method 800 illustrated in FIG. 8.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code. In many implementations, a computer-readable storage medium is non-transitory, a physical, and/or tangible storage medium. Such a medium may take the form of a non-volatile media or volatile media. Non-volatile media include, for example, optical and/or magnetic disks, such as the non-transitory storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. A computer-implemented method of recognizing gestures, the method comprising:
    receiving a plurality of color images of a scene;
    processing images of the plurality of color images, wherein the processing of the images of the plurality of color images comprises:
        grouping pixels of individual images of the images being processed into a plurality of clusters, each cluster grouped at least based on similarity of color, wherein similarity of color is evaluated by comparing a color of pixels with a color of other pixels within an image, wherein the grouping the pixels is performed without prior identification of an object as a gesture capable object;
    tracking whether a first cluster of the plurality of clusters in the plurality of color images moves, the first cluster corresponding to a gesture capable object within the scene;
    tracking whether a second cluster of the plurality of clusters in the plurality of color images moves, the second cluster not corresponding to a gesture capable object within the scene; and
    determining, based on tracking the first cluster and the second cluster, that the first cluster is performing a gesture, wherein the determining is performed without prior identification of an object performing the gesture as a gesture capable object.

2. The computer-implemented method of claim 1, wherein the processing of the images of the plurality of color images further comprises:
    assigning one or more tracking points to the plurality of clusters.

3. The computer-implemented method of claim 2, wherein the tracking whether the first cluster moves comprises:
    tracking whether a tracking point of the one or more tracking points assigned to the first cluster moves.

4. The computer-implemented method of claim 2, wherein:
    each tracking point of the one or more tracking points represents a location within an image of a corresponding cluster of the plurality of clusters; and
    the location of the corresponding cluster comprises a value based on an average of coordinates of pixels in the corresponding cluster, a median of coordinates of pixels in the corresponding cluster, or both.

5. The computer-implemented method of claim 2, wherein the assigning the one or more tracking points to the plurality of clusters comprises assigning two or more tracking points to the first cluster, and the determining that the first cluster is performing the gesture comprises:
    separately determining for each tracking point of the two or more tracking points whether movement of the each tracking point corresponds to the gesture.

6. The computer-implemented method of claim 1, wherein each pixel of the plurality of color images is grouped in to at least one of the plurality of clusters.

7. The computer-implemented method of claim 1, wherein each pixel of the plurality of color images is grouped solely based on one or more colors of pixels of the images.

8. The computer-implemented method of claim 1, wherein the processing of the images of the plurality of color images further comprises, for each of the plurality of color images:
    prior to the grouping the pixels, converting one or more colors of an image.

9. The computer-implemented method of claim 8, wherein the converting the one or more colors of the image comprises:
    adjusting the one or more colors of the image such that the one or more colors of the image conform to a Lab color space.

10. The computer-implemented method of claim 1, further comprising identifying an object based on the movement of the first cluster.

11. The computer-implemented method of claim 10, wherein the object is a hand.

12. The computer-implemented method of claim 1, wherein the tracking whether the first cluster moves further comprises:
creating a plurality of history vectors, wherein:
each history vector of the plurality of history vectors corresponds to a respective tracking point, and
each history vector of the plurality of history vectors is configured to identify movement of the respective tracking point over time.

13. The computer-implemented method of claim 12, wherein the determining that the first cluster is performing the gesture further comprises:
comparing the plurality of history vectors with a plurality of predefined gestures; and
identifying a history vector of the plurality of history vectors that most closely matches a predefined gesture of the plurality of predefined gestures.

14. The computer-implemented method of claim 1, wherein the determining that the first cluster is performing the gesture includes determining that several clusters, including the first cluster, move substantially in unison.

15. The computer-implemented method of claim 1, wherein pixels of the first cluster of the plurality of clusters are grouped by a substantially different color than pixels of the second cluster of the plurality of clusters.

16. The computer-implemented method of claim 1, further comprising:
in response to determining that the first cluster is performing the gesture, identifying the cluster performing the gesture, associating the first cluster with the corresponding gesture capable object.

17. The computer-implemented method of claim 1, wherein the (1) determining that the first cluster is performing the gesture, (2) tracking whether the first cluster moves, and (3) tracking whether the second cluster moves are performed independently of depth information corresponding to the plurality of color images.

18. The computer-implemented method of claim 1, further comprising:
tracking each of the plurality of clusters; and
wherein the determining that the first cluster is performing the gesture includes determining that the movement of the first cluster of the plurality of clusters in the plurality of color images corresponds to the gesture and movement of remaining clusters of the plurality of clusters do not correspond to the gesture.

19. A system for recognizing gestures, the system comprising:
one or more processors; and
a memory communicatively coupled with and readable by the one or more processors and having stored therein processor-readable instructions which, when executed by the one or more processors, cause the one or more processors to:
receive a plurality of color images of a scene;
process images of the plurality of color images, wherein the processing of the images of the plurality of color images comprises causing the one or more processors to:
group pixels of individual images of the images being processed into a plurality of clusters, each cluster grouped at least based on similarity of color, wherein similarity of color is evaluated by comparing a color of pixels with a color of other pixels within an image, wherein the grouping the pixels is performed without prior identification of an object as a gesture capable object;
track whether a first cluster of the plurality of clusters in the plurality of color images moves, the first cluster corresponding to a gesture capable object within the scene;
track whether a second cluster of the plurality of clusters in the plurality of color images moves, the second cluster not corresponding to a gesture capable object within the scene; and
determine, based on tracking the first cluster and the second cluster, that the first cluster is performing a gesture, wherein the determining is performed without prior identification of an object performing the gesture as a gesture capable object.

20. The system for recognizing gestures of claim 19, wherein the processor-readable instructions that cause the one or more processors to process images of the plurality of color images further comprises processor-readable instructions configured to cause the one or more processors to:
assign one or more tracking points to the plurality of clusters.

21. The system for recognizing gestures of claim 20, wherein the processor-readable instructions that cause the one or more processors to tracking whether the first cluster moves comprise processor-readable instructions configured to cause the one or more processors to:
track whether a tracking point of the one or more tracking points assigned to the first cluster moves.

22. The system for recognizing gestures of claim 20, wherein:
each tracking point of the one or more tracking points represents a location within an image of a corresponding cluster of the plurality of clusters; and
the location of the corresponding cluster comprises a value based on an average of coordinates of pixels in the corresponding cluster, a median of coordinates of pixels in the corresponding cluster, or both.

23. The system for recognizing gestures of claim 20, wherein the processor-readable instructions that cause the one or more processors to assign one or more tracking points to the plurality of clusters comprises processor-readable instructions that cause the one or more processors to assign two or more tracking points to the first cluster, and the processor-readable instructions that cause the one or more processors to determine that the first cluster is performing the gesture comprises processor-readable instructions that cause the one or more processors to:
separately determine for each tracking point of the two or more tracking points whether movement of the each tracking point corresponds to the gesture.

24. The system for recognizing gestures of claim 19, wherein each pixel of the plurality of color images is grouped into at least one of the plurality of clusters.

25. The system for recognizing gestures of claim 19, wherein the processor-readable instructions that cause the one or more processors to process the images of the plurality of color images further comprises processor-readable instructions configured to cause the one or more processors to, for each of the plurality of color images:
prior to the grouping the pixels, convert one or more colors of an image.

26. The system for recognizing gestures of claim 25, wherein the processor-readable instructions that cause the one or more processors to convert the one or more colors of the image comprises processor-readable instructions configured to cause the one or more processors to:

adjust the one or more colors of the image such that the one or more colors of the image conform to a Lab color space.

27. The system for recognizing gestures of claim 19, wherein the processor-readable instructions further comprise processor-readable instructions, when executed, cause the one or more processors to:

identify the gesture capable object corresponding to the first cluster.

28. The system for recognizing gestures of claim 27, wherein the gesture capable object is a hand.

29. The system for recognizing gestures of claim 19, wherein the processor-readable instructions that cause the one or more processors to track whether the first cluster moves further comprises processor-readable instructions configured to cause the one or more processors to:

create a plurality of history vectors, wherein:
each history vector of the plurality of history vectors corresponds to a respective tracking point, and
each history vector of the plurality of history vectors is configured to identify movement of the respective tracking point over time.

30. The system for recognizing gestures of claim 29, wherein the processor-readable instructions that cause the one or more processors to determine that the first cluster is performing the gesture further comprise processor-readable instructions configured to cause the one or more processors to:

compare the plurality of history vectors with a plurality of predefined gestures; and
identify a history vector that most closely matches a predefined gesture of the plurality of predefined gestures.

31. An apparatus for recognizing gestures, the apparatus comprising:

means for receiving a plurality of color images of a scene;
means for processing images of the plurality of color images, wherein the means for processing the images of the plurality of color images comprises:
means for grouping pixels of individual images of the images being processed into a plurality of clusters, each cluster grouped at least based on similarity of color, wherein similarity of color is evaluated by comparing a color of pixels with a color of other pixels within an image, wherein the grouping the pixels is performed without prior identification of an object as a gesture capable object; and
means for tracking whether a first cluster of the plurality of clusters in the plurality of color images moves, the first cluster corresponding to a gesture capable object within the scene;
means for tracking whether a second cluster of the plurality of clusters in the plurality of color images moves, the second cluster not corresponding to a gesture capable object within the scene; and
means for determining, based on tracking the first cluster and the second cluster, that the first cluster is performing a gesture, wherein the determining is performed without prior identification of an object performing the gesture as a gesture capable object.

32. The apparatus for recognizing gestures of claim 31, wherein the means for processing the images of the plurality of color images further comprises:

means for assigning one or more tracking points to the plurality of clusters.

33. The apparatus for recognizing gestures of claim 32, wherein the means for tracking whether the first cluster moves comprises:

means for tracking whether a tracking point of the one or more tracking points assigned to the first cluster moves.

34. A non-transitory processor-readable medium comprising processor-readable instructions configured to cause a processor to:

receive a plurality of color images of a scene;
process images of the plurality of color images, wherein the processing of the images of the plurality of color images comprises:
group pixels of individual images of the images being processed into a plurality of clusters, each cluster grouped at least based on similarity of color, wherein similarity of color is evaluated by comparing a color of pixels with a color of other pixels within an image, wherein the grouping the pixels is performed without prior identification of an object as a gesture capable object; and
track whether a first cluster of the plurality of clusters in the plurality of color images moves, the first cluster corresponding to a gesture capable object within the scene;
track whether a second cluster of the plurality of clusters in the plurality of color images moves, the second cluster not corresponding to a gesture capable object within the scene; and
determine, based on tracking the first cluster and the second cluster, that the first cluster is performing a gesture, wherein the determining is performed without prior identification of an object performing the gesture as a gesture capable object.

35. The non-transitory processor-readable medium of claim 34, wherein the processor-readable instructions that cause the processor to process the images of the plurality of color images further comprises processor-readable instructions configured to cause the processor to:

assign one or more tracking points to the plurality of clusters.

36. The non-transitory processor-readable medium of claim 35, wherein the processor-readable instructions that cause the processor to determine that the first cluster is performing the gesture comprises processor-readable instructions configured to cause the processor to:

determine that the first cluster is performing the gesture using movement of a tracking point of the one or more tracking points assigned to the first cluster.

* * * * *